Figure 1:
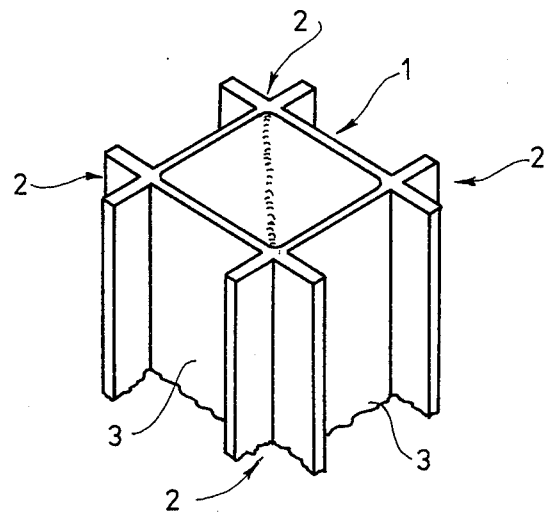

United States Patent [19]

Martin

[11] 4,032,241
[45] June 28, 1977

[54] CONSTRUCTIONAL ELEMENTS

[76] Inventor: Derek Thomas Martin, 24 Torwood Road, Khandallah, Wellington, New Zealand

[22] Filed: July 1, 1975

[21] Appl. No.: 592,216

[30] Foreign Application Priority Data

July 15, 1974 New Zealand .................... 174863

[52] U.S. Cl. .............................. 403/173; 403/217; 403/401
[51] Int. Cl.² ......................................... F16B 12/10
[58] Field of Search .......................... 403/170–178, 403/217, 219, 231, 232, 401, 402; 52/753 R, 753 C, 753 D, 753 K, 586, 280, 285

[56] References Cited

UNITED STATES PATENTS

| 1,936,733 | 11/1933 | Richardson | 52/753 K UX |
| 2,386,588 | 10/1945 | Brunton et al. | 403/173 |
| 3,603,053 | 9/1971 | Loghem et al. | 52/753 K X |

FOREIGN PATENTS OR APPLICATIONS

| 83,081 | 11/1919 | Switzerland | 403/401 |

Primary Examiner—Wayne L. Shedd
Attorney, Agent, or Firm—Bucknam and Archer

[57] ABSTRACT

A connector for intersecting structural members which connector has a hollow box-shaped central portion and fins projecting from the outer corners thereof to form with the sides of such central portion opposite aligned channels which receive the end portions of mitred, abutting, intersecting structural members.

2 Claims, 7 Drawing Figures

U.S. Patent June 28, 1977 Sheet 1 of 3 4,032,241

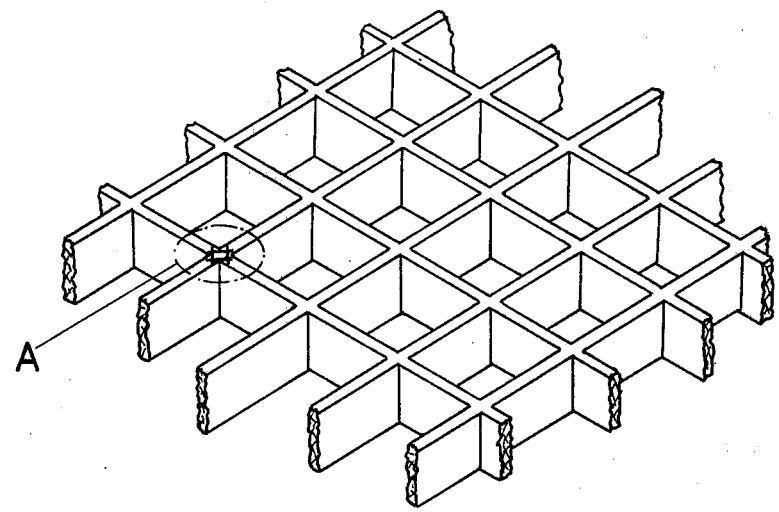
Fig. 2a
Fig. 3
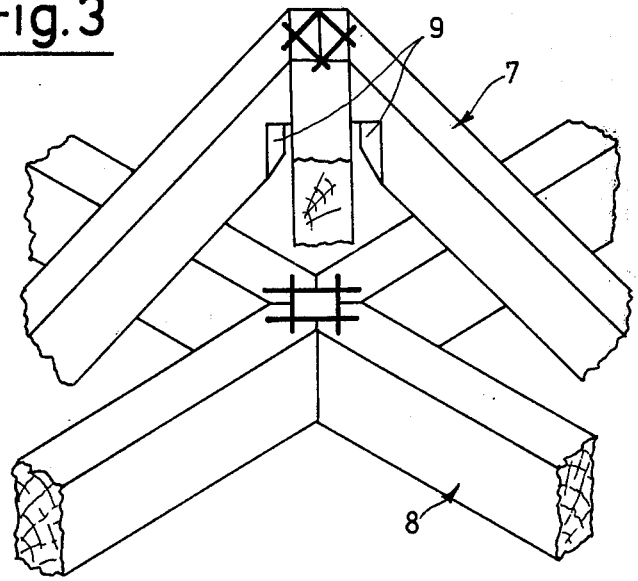

CONSTRUCTIONAL ELEMENTS

This invention relates to constructional elements particularly elements for use in joining intersecting or abutting members of a structure.

The invention has been devised with the object of reducing on site labour costs, simplifying known building methods, providing a saving in building materials, and to improve building techniques.

The invention in its various aspects has application to the construction of timber framed domestic dwellings, car decks, outbuildings and the like and commercial buildings such as office blocks, and relates particularly but not essentially to flooring, ceiling and partitioning work in such buildings and to larger structures such as bridges, wharfs, warehouses and the like.

According to one aspect of this invention there is provided a connector for building constructions and the like comprising in cross-section a hollow box-shaped central portion having fins projecting from the outer corners thereof to form with the sides of the hollow box-shaped portion oppositely disposed and aligned channels, wherein the end portions of mitred intersecting structual members may be fitted to engage within channels so formed and abut to one another such that they project at substantially right angles to one another, and to be aligned diagonally with opposite corners of the said hollow box-shaped portion.

According to a further aspect of this invention there is provided a method of building construction comprising cutting a mitre on the ends of structual members and joining the ends about a connector and providing a joint about the connector where the mitred ends of the structural members abut firmly onto one another in the channels formed between the adjacent surfaces of the fins of the connector and providing a tolerance between the mitred ends of the structural members and the remaining surface areas of the fins.

The connector of this invention may be formed from an extrusion or roll forming process and may be folded from sheet material or may be fabricated from commercial steel sections of any suiitable engineering material such as mild steel, aluminium, plastics and the like.

The connector when used with timber constructions is preferably formed so that the box-shaped central portion is light-gauged so as to be deformable by a suitable tool member.

A timber construction, according to the method of the present invention, can be precut, fabricated in a factory and jointed ready for placement on a site, and transported to the site as a single unit, or alternatively, precut and packed as components of a unit for delivery to a site for erection.

It is envisaged that the frame constructed will have application to new and existing timber frammimg techniques in buildings of the type aforementioned.

When a framework constructed according to the method of the present invention is assembled, the assembly is preferably done on a flat or chambered surface so that the assembled framework will provide a suitable upper plain surface for floor boards or other sheet materials such as composite board, or panels and the like. When intersecting framework members are joined about the connectors of the present invention the connectors can be precut to lengths according to the depth of joint required. The jointing of the framework members at the intersecting point is first made by placing members about the connector and then by sliding the members at their precut mitred end portions on to the connector, the members forming a right angled intersection with the adjacent members. Similar steps are performed until the lattice framework of desired dimensions is made up. Alternatively, a framework can be jointed about the connectors by sliding the connectors down between the framework.

The ends of the frame can comprise a plurality of spaced timbers which are adapted to be supported from bearers or posts or walls of a structure. The lattice framework is preferably formed so that the members are at approximately 2 foot (600 millimetre) centres both ways in regular form or any desired rectangular form to suit requirements.

The assembled framework is preferably rectangular because of the manner of the butting of the mitred end portions of the members about the connector, and when the framework is assembled and the assembler is satisfied the framework is jointed correctly the joints about the connectors thereof can be made rigid by the use of an expanding tool.

Preferably the expanding tool is inserted in the hollow box-shaped central portion of the connector member and operated to give a number of deformations, proportional to the depth thereof. The tool is used to outwardly deform the internal walls of the central portion at variable depths and operated to form ridges in the external wall thus depressing the ends of the butted timber members and securing the joints. The expanding tool is preferably adapted to mark the end of the connector in which it has been inserted so that an assembler can ascertain at a glance which joints have been expanded. Both axis orthogonal to the walls of the central portion are deformed in this manner to make rigid joints and the walls may then be handled without damage or mis-alignment and be moved from a factory as a unit on to the site.

When the frame construction of this invention is placed on site and supported by a load bearing structure, it provides both lateral and transverse members, and can be used to replace the conventional bottom bearer and upper floor joists at 16 inch -18 inch centres. Thus the frame construction of this invention provides increased span capabilities using joist members of small lengths; furthermore when such an underframe construction is incorporated in multi-storey buildings, the lattice nature of the frame provides an ideal base for the attachment of ceiling or floors.

A special flooring requirement for surfaces or insulation can be incorporated by fixing battens and an additional layer of material below the flooring surface abovementioned thus creating a sandwich.

Where a framework constructed according to the present invention is unsupported by beams or intermediate walls or supports, the members making up the frame can be varied in depth according to the design load characteristics at any point which the spanning frame is required to resist; for example the frame could have say 8 × 2 inches or 200 × 50 millimeter timbers at the point where the greatest stress is likely to occur and 5 × 2inches or 125 × 50 millimeter at the point of less stress in the frame. Such a method of construction will have particular uses in replacing conventional flooring and ceiling systems for multi-floor buildings, thus reducing material costs and on site labour costs.

Additionally it is envisaged that laminated timbers can be used for making components of the lattice framework thus using timber more efficiently. The connectors being within the timber members are not exposed to weathering of fire hazards.

The connector of the invention can be used additionally as a column or staunchion, about which intersecting structual wall members can be erected using the construction method described for floor and frame constructons. In such instances the expansion if required can be made a short distance from the upper part or lower part of the column. It is envisaged that this method of construction will provide an efficient method of erecting walls and partitioning work in domestic dwellings and offices. If the constructional element is not expanded, then such structures may form a useful and rigid temporary structure. It is further envisaged that the joints of members making up structures of the type described herein may be glued or nailed about a connector of the present invention as an alternative to the use of the expansion method.

Thus alternative forms of the connector are based on similar joint configuration and connector position. A variation of the connector form can include a glued joint where fins from the body are flat or nobbled and located in a portion only of a saw cut in a joist end. It is envisaged other forms of connectors can combine elements of each of the connectors described.

It is also envisaged that the constructional element may have uses in heavy construction where it is desired to joint intersecting members such as in bridge construction where the connector may be prefabricated from roll steeled channels continuously welded to the described configuration. Secure joints in such instances of construction may be achieved for example by connector extensions extending above the joists to provide shear connectors in the decking, such as concrete and to provide a screw bolt with washers and a nut passed centrally through the hollow portion of the connector to secure the structure together.

Additionally, such a member provides an added advantage in that the tie bolts can be passed through the central portion of the connectors if required to secure structures above or below the lattice framework. If bolts are used to hold a wall plate for example other structural elements may not be required.

When a construction is located where it does not require the second or third joists for example corners and sides, some sets of fins of the connector can be omitted.

Figure 2:
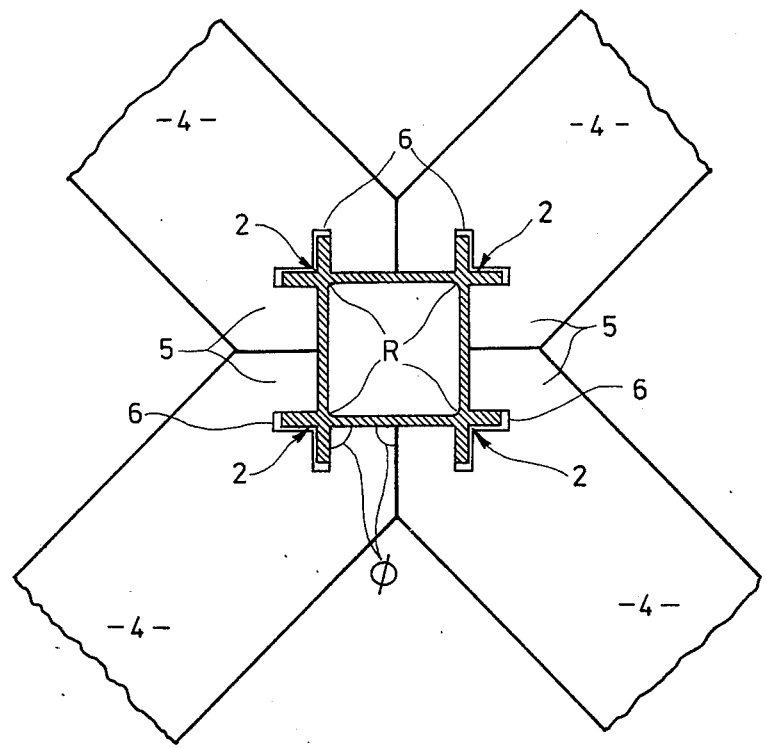
Figure 3A:
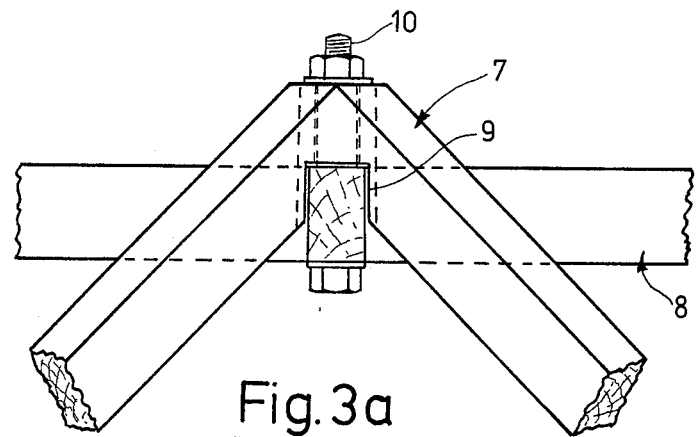
Figure 4:
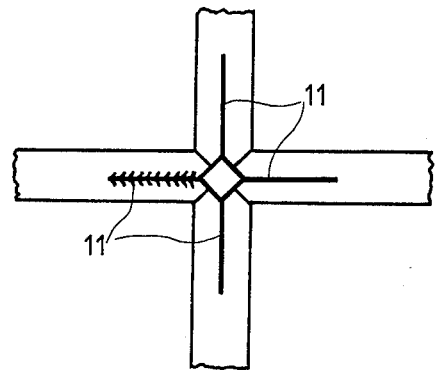
Figure 5:
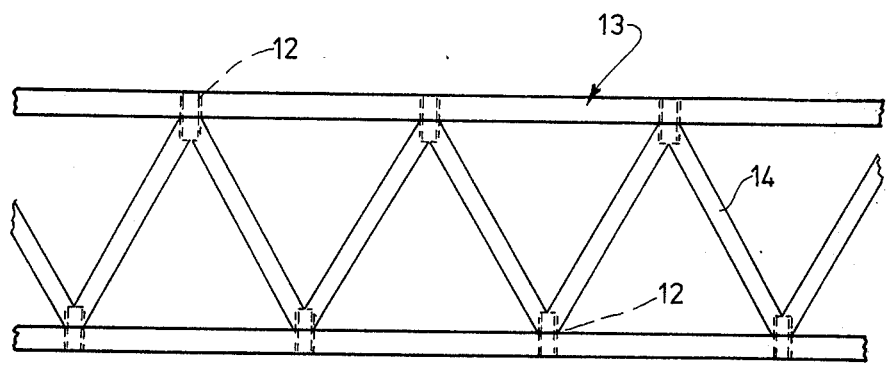

A preferred embodiment of the invention will now be described with reference to the accompanying drawings in which;

FIG. 1 is a perspective view of one form of connector of the present invention, and FIG. 2 is a plan view and shows an application of the connector of FIG. 1 where intersecting structural members are shown to be fastened about the connector, and FIG. 2A is a perspective view of a framework of intersecting structural members showing them fastened by the connectors of the present invention, and, FIGS 3 and 3A illustrate a further application of the connector of the present invention, and FIG. 4 is a further alternative form of the connector of the present invention, and, FIG. 5 illustrates yet a further application of connectors of the present invention.

Referring to the drawings; FIG. 1 thereof illustrates a preferred form of connector of the present invention having a hollow box-shaped central portion indicated by arrow 1, and fins indicated by arrow 2 projecting from the outer edges of the central portion. The fins 2 are arranged to provide channels 3 on the sides of the central portion, and adjacent channels can have fins common to each side of the channel with the fins angled out from the central portion as illustrated in FIG. 4.

FIG. 2 of the drawings illustrates the connector of FIG. 1 having intersecting structural members fixed thereabout. Each of the structural members 4 are provided with mitred end portions 5, such being provided so that the end portions when they are fitted to the connector are complimentary to their adjacent members. The end portions 5 of the structural members 7 are all mitred such that the angles $\phi$ are right angles. The width of the cuts 6 of the structural members 4 is predetermined to give a tolerance between the walls of the cut and the adjacent surfaces of the fins 2. Little or no tolerance is provided, however, between the end portions of the structural members which are located in the channel 3 formed between the fins 2 of the connector as it has been found that it is desirable to achieve a neat fit between these adjacent surfaces. The mitred ends 5 of structural members 4 can be fitted to the connector by sliding them over the connector.

In FIG. 2 of the drawings it can be seen from the cross-section of the preferred form of connector of FIG. 1, that the fins 2 can be of substantially greater thickness than the walls of the box-shaped section. Thus the distance between adjacent fin surfaces where the channel is formed is less than the distance between the inner wall surfaces of the box-shaped portion 1, by an amount equal to the difference in thickness of the walls thereof and the fins 2.

Stresses in the connector are reduced by the provision of radii R in the internal corners of the box section 1.

FIG. 2A of the drawings illustrates a framework constructed from intersecting structural members which are joined about the connectors of the present invention. The detail A in the drawing is a detail of one joint of the structure, such joint being identical to that illustrated by FIG. 2 of the drawings.

FIG. 3 of the drawings illustrates a construction technique made possible by the adaption of the present invention where intersecting structural members indicated by arrow 7 (which can be floor or ceiling joists) are joined about a connector of a present invention and adapted to interengage with similarly joined structural members indicated by arrow 8 so that they interlock with one another. The joining together of the two components is better illustrated by FIG. 3A of the drawings. Some structural members are provided with cut out portions 9 so that the structural members may engage in an interlocking manner with other structural member 8. Once joined a fixing means such as a bolt 10 may be inserted between box-shaped portions 1 of the connector thus firmly securing two independent structures together. It will be appreciated that such joining together of structural members may be made in a reverse manner to that illustrated by FIGS. 3 and 3A.

FIG. 4 of the drawings illustrates a further form of connector of the present invention where the fin portions are made from saw toothed members and illustrates the fins 11 are angled out from the central portion.

FIG. 5 of the drawings illustrates a further use for the connectors of the present invention. A space frame is illustrated where the connectors 12 shown in dotted outline create an axis about which members 13 of the frame are fixed. Although a cross-section of such a frame is illustrated it will be appreciated that the chords 14 may be of any number extending from the joints about the connectors radially and by this method a framework of relatively small cross-section and covering a large area of span may be formed.

Preferred embodiments of the invention have been described by way of example only and it will be appreciated that other forms may be provided without departing from the scope of the invention as set forth in the appended claims.

What I claim is:

1. A connector for building constructions and the like comprising in cross-section a four-sided box-shaped central portion having fins in pairs projecting outwardly from each of the corners thereof at right angles to each other and at right angles to the adjacent outer surfaces of the central portion, the said fins forming with the adjacent outer surfaces of the central portion four oppositely disposed substantially right-angular longitudinal channels wherein mitred ends of intersecting structural members may be fitted to the channels to engage with the fins and to project substantially at right angles to one another such that the longitudinal axis of the structural members align diagnally with opposite corners of the said central portion.

2. The connector as claimed in claim 1 wherein the fins are substantially thicker in cross-section than the side of the box-shaped central portion and inner corners of the box-shaped portion are provided with radii.

* * * * *